July 14, 1942.　　　　T. ULRICH　　　　2,289,395
END WALL CONSTRUCTION FOR VEHICLE BODIES
Filed Feb. 19, 1938　　　4 Sheets-Sheet 1
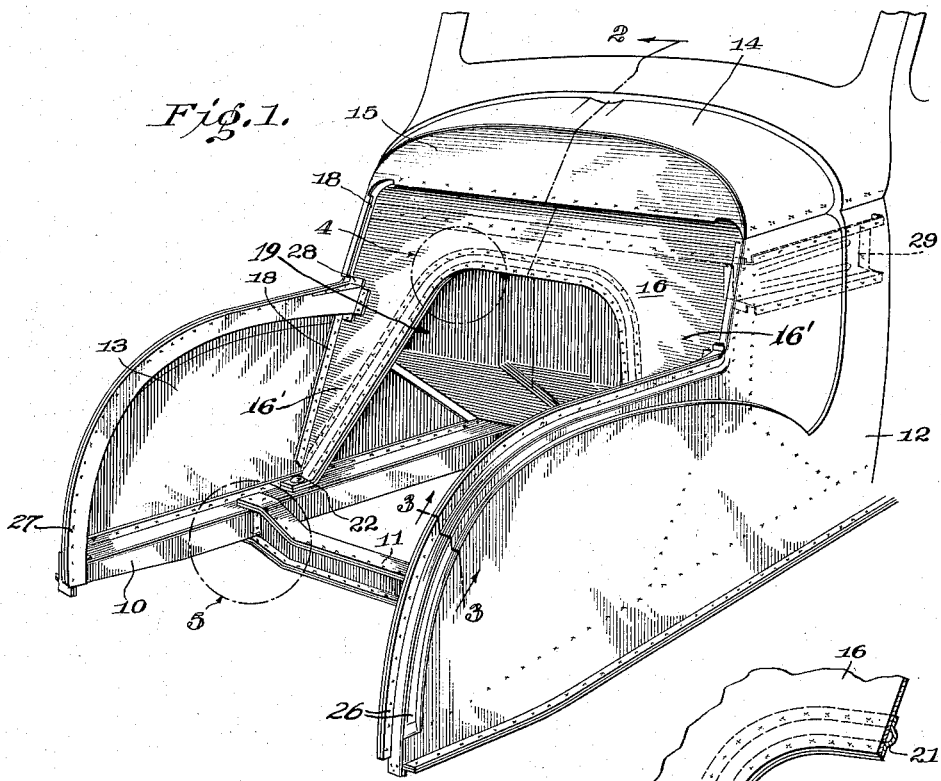
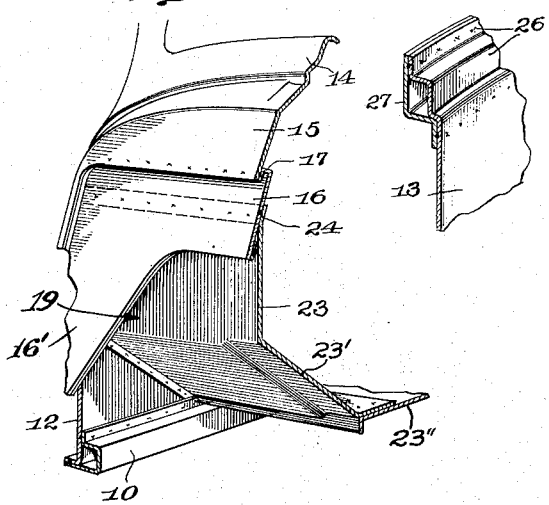
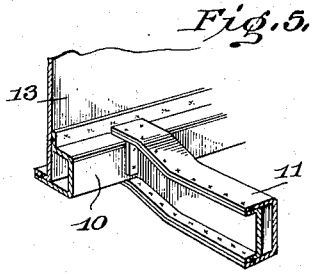
INVENTOR.
Theodore Ulrich
BY John P. Tebon
ATTORNEY.

July 14, 1942.　　　T. ULRICH　　　2,289,395
END WALL CONSTRUCTION FOR VEHICLE BODIES
Filed Feb. 19, 1938　　　4 Sheets-Sheet 2
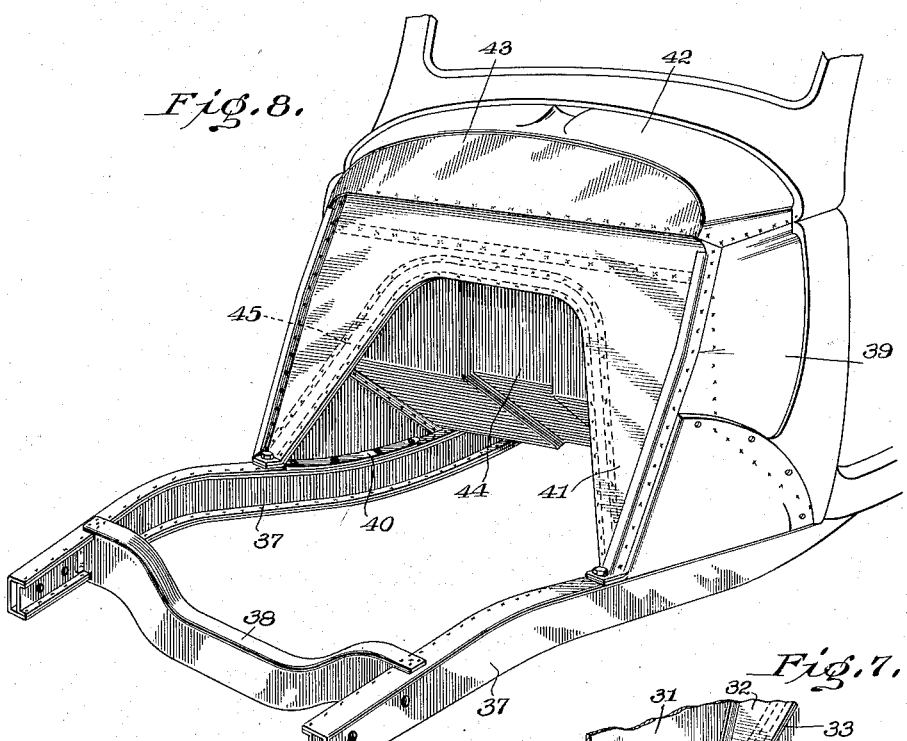
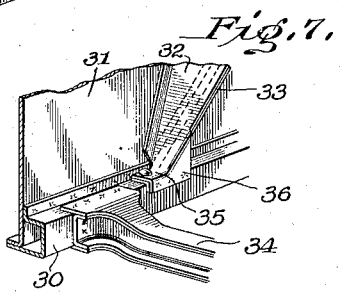
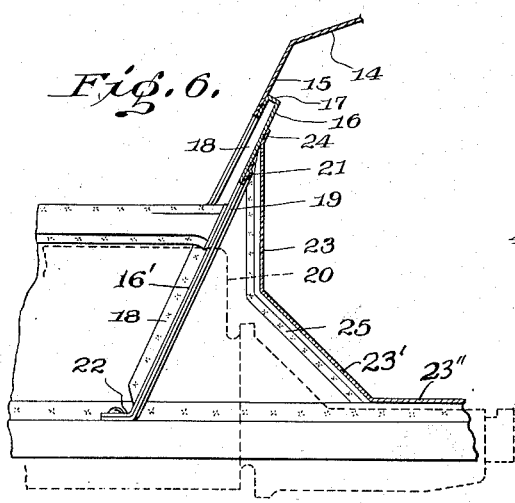
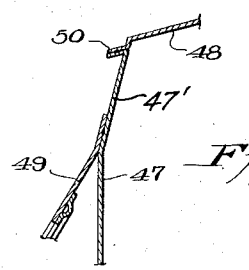
INVENTOR.
Theodore Ulrich
BY John P. Tarbox
ATTORNEY.

INVENTOR.
Theodore Ulrich
BY John P. Tarbox
ATTORNEY.

July 14, 1942.　　　　T. ULRICH　　　　2,289,395
END WALL CONSTRUCTION FOR VEHICLE BODIES
Filed Feb. 19, 1938　　　4 Sheets-Sheet 4
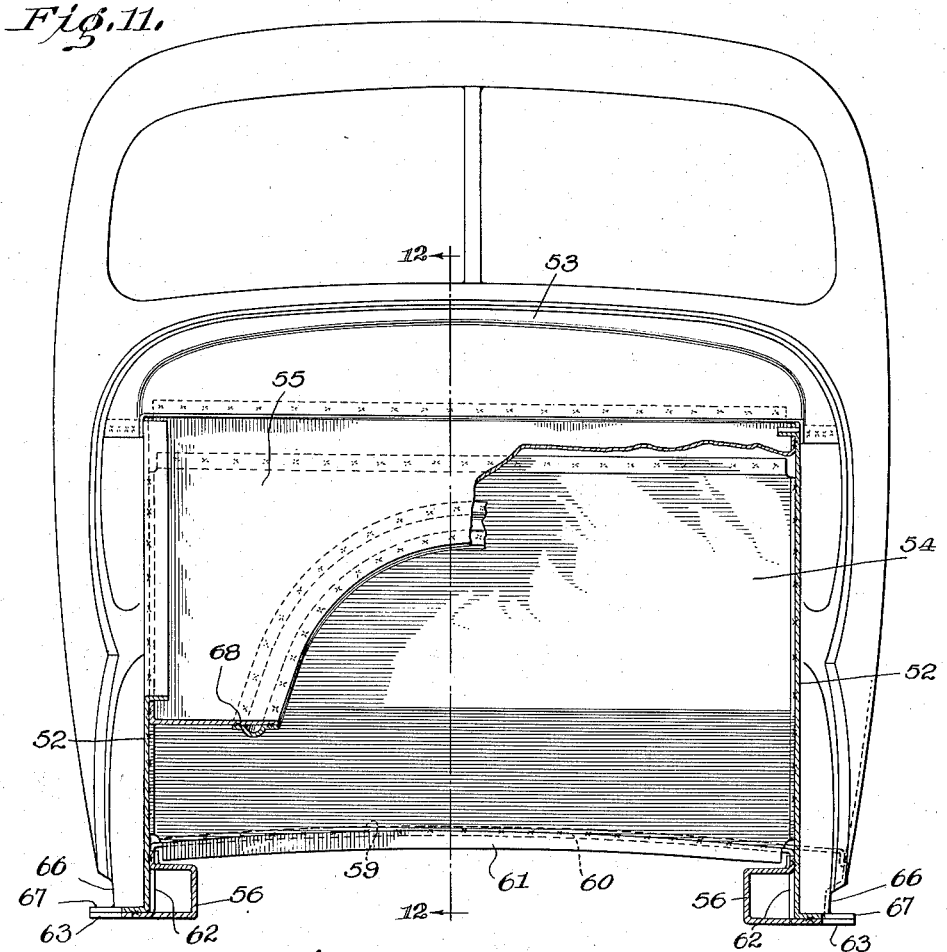
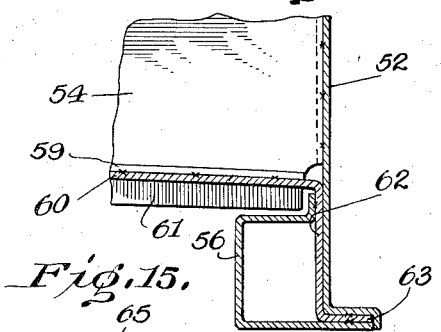
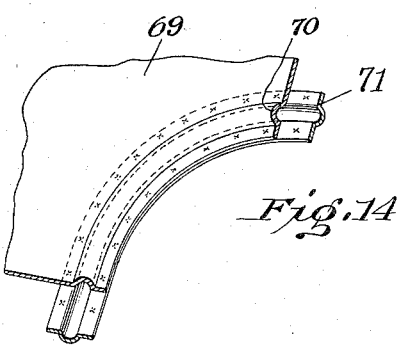
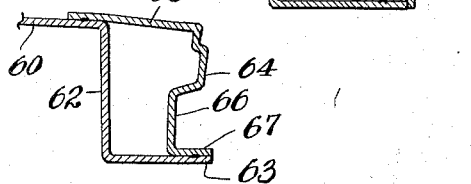
INVENTOR.
Theodore Ulrich
BY John P. Tatbox
ATTORNEY.

Patented July 14, 1942

2,289,395

UNITED STATES PATENT OFFICE 2,289,395

END WALL CONSTRUCTION FOR VEHICLE BODIES

Theodore Ulrich, Detroit, Mich., assignor to Edward G. Budd Mfg. Company, Philadelphia, Pa., a corporation of Pennsylvania Application February 19, 1938, Serial No. 191,396

30 Claims. (Cl. 296—28)

The invention relates to vehicle bodies and more particularly to the construction of the end wall thereof. The invention is especially adapted for use in connection with combined vehicle body and chassis structures.

The main object of the invention is to strongly reinforce the end wall of a vehicle body, and to tie the longitudinal members supporting the power plant into the load transmitting members of the body superstructure. One of the main aims of the invention is to attain said objects with the smallest possible expense without increasing the weight of the complete structure and without impeding the insertion and the removal of the power plant.

The objects of the invention are chiefly attained by the provision of a transverse wall structure inserted between the side wall members enclosing the power plant compartment, said transverse wall structure being inclined in the longitudinal direction of the car and being provided with a wide opening allowing a part of the power plant to extend therethrough. This inclined transverse wall structure is connected along its margins with the side walls, upper transverse members and lower longitudinal side sill members so that all these members mutually interbrace one another. The transverse wall structure owing to its inclination does not only efficiently brace the end wall of the vehicle body and tie the power plant supporting members into the load transmitting members of the body superstructure but does not interfere with the insertion and removal of the power plant and does not impede the access to those parts of the power plant extending through the opening of the transverse wall structure toward the interior of the body.

Further objects and features of the invention will become apparent from the following description of some embodiments of the invention when read in connection with the attached drawings.

In the drawings:

Fig. 1 is a perspective view of the forward end and of the cowl of a combined vehicle body and chassis structure.

Fig. 2 is a section along the longitudinal vertical middle plane (line 2) of the structure shown in Fig. 1 and a perspective view of the adjacent members the forward part being broken away.

Fig. 3 is a section along line 3—3 of Fig. 1 and a fragmentary perspective view of the adjacent parts.

Figs. 4 and 5 are fragmentary perspective views of the parts surrounded in Fig. 1 by the circles 4 and 5 respectively.

Fig. 6 is a section along the vertical longitudinal middle plane of the vehicle structure through the shroud pan, the inclined wall structure and adjoining parts, the power plant being indicated by dotted lines.

Fig. 7 is a view similar to that of Fig. 5 but of a slightly modified embodiment.

Fig. 8 is a view similar to that of Fig. 1 but showing another modified embodiment.

Fig. 9 is a fragmentary section taken along the vertical longitudinal middle plane of the vehicle showing the modified connection between the dashboard or shroud pan, the upper cowl wall and the inclined wall structure.

Figure 10:
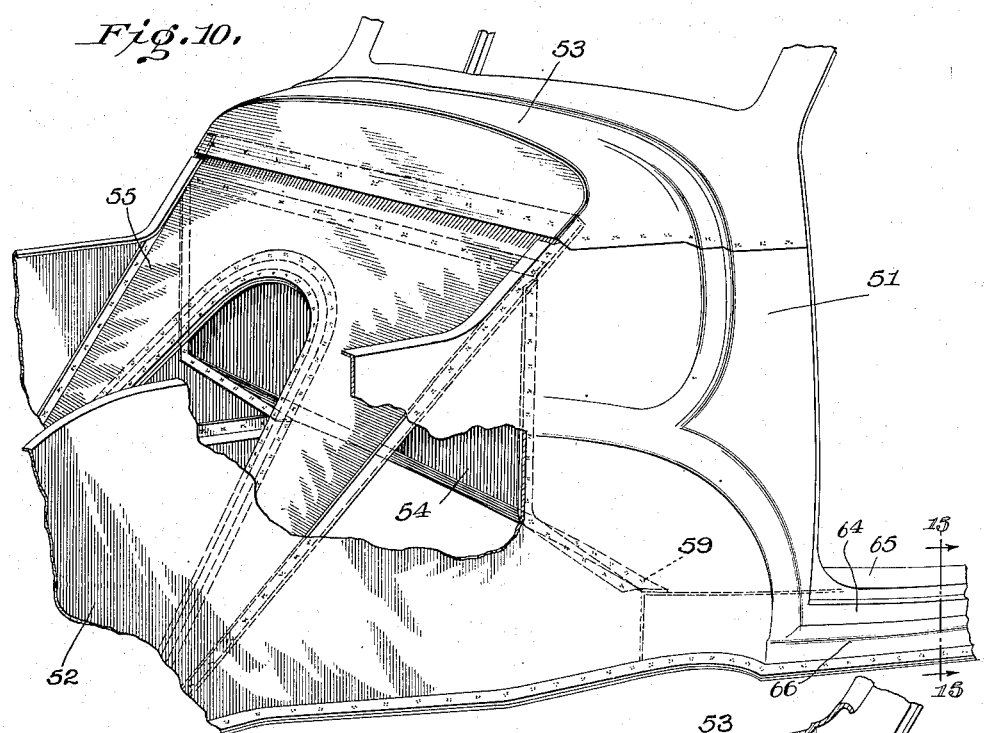

Fig. 10 is a fragmentary perspective view of a further modification.

Fig. 11 is a front elevation, partly in section, of the embodiment shown in Fig. 10.

Figure 12:
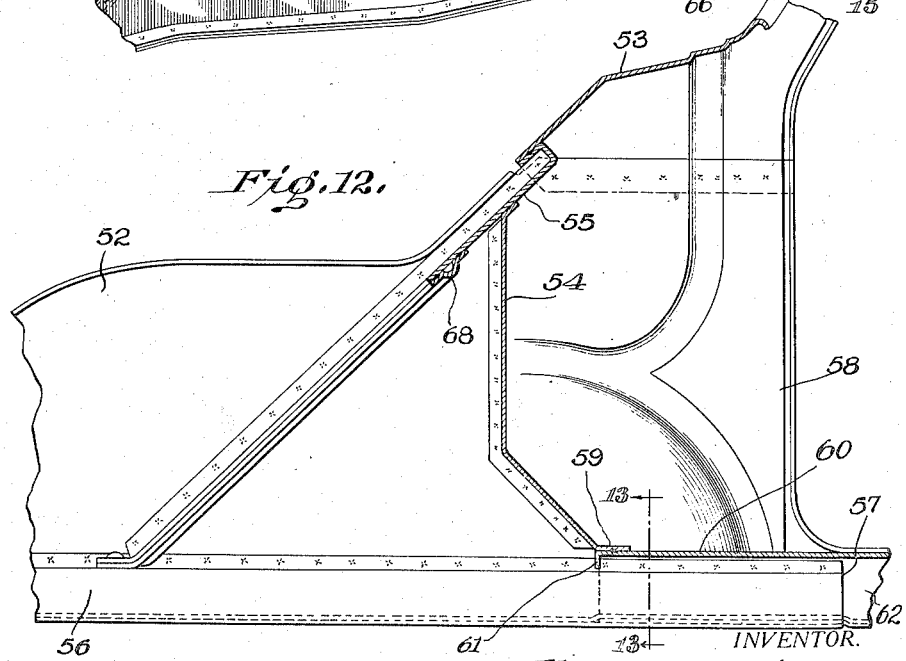

Fig. 12 is a section along the line 12—12 of Fig. 11.

Fig. 13 is a section along the line 13—13 of Fig. 12.

Fig. 14 is a view similar to Fig. 4 showing a modification of a detail.

Fig. 15 is a section through the threshold portion taken along line 15—15 of Fig. 10.

In the embodiment shown in Figs. 1 to 6, longitudinal side sill members of a combined body underframe and chassis structure are designated by the numeral 10. The members 10 are interconnected near their forward ends by a box sectional cross member 11. The outwardly facing mouth of each U-section side sill member 10 is closed by the lower marginal part of the outer body panel 12 and its forward continuation 13 forming the inner vertical wall of the front wheel housing. The paneling 12 forms the vertical side wall of the cowl and the lower part of the front post. The two side wall members 12 are interconnected by stamping 14 forming the upper part of the cowl and being provided along its forward margin with a downwardly extending section 15. A transverse wall 16 is fastened along its upper margin to the rear side of the lower margin of the member 15. The upper marginal part of the wall 16 is provided with a forwardly and then downwardly extending flange 17 allowing the entrance of welding tools. The side margins of the wall 16 are provided with forwardly bent off flanges 18 which rest against and are secured to the inner surface of the side wall members 12, 13. The wall 16 is rearwardly inclined and surrounds on three sides an opening 19 through which the power plant 20 may extend. The transverse width of the opening 19 increases from its upper margin downwardly and the margins of the opening are reinforced by a continuous flanged U-sectional strip 21 welded to the rear face of the wall 16. The lower ends of the wall 16 and of the reinforcing strip 21 are provided with forwardly extending tangs 22 resting on and being rigidly secured to the upper wall of the longitudinal sill members 10.

A lower shroud pan member 23 is fastened along its upper margin at 24 to the rear face of the inclined wall 16 above the opening 19. The side margins of the shroud pan member 23 are provided with bent off flanges 25 resting against and being fastened, as by welding, to the side wall members 12. The lower portion 23' of the shroud pan member forms the usual toe board, which latter merges into the floor panel 23''.

The transverse structure 16 comprises, therefore, on each side of the opening 19 a section 16' which, in effect, constitutes a flat brace having a wide connection between its upper end and the shroud or dashboard portions 15, 23. These sections 16' are, in the embodiment, comparatively narrow at their lower ends and widen gradually toward the upper ends. This form affords ample space between the lower ends of the sections 16' and wide connections with the shroud pan or dashboard, thereby avoiding the danger of stress concentrations which might destroy such connection. The inner margins of the sections 16' extend unsupportedly from the side wall extensions 13 into the motor compartment, thereby leaving also behind them free space which is available for parts of the motor unit or other accessories.

The wheel housing walls 13 are provided along their upper margins with inwardly offset flanges 26 Z-shaped in cross section. Separate strips 27 also Z-shaped in cross section are fastened to the wall members 13 along the margins of the said flanges 26 so as to form therewith box sectional structures, as shown in Fig. 3. The forward ends of these box sectional structures are fastened to the forward ends of the longitudinal side sill members 10 whereas their rear ends are fastened by means of bent off tangs 28 to the transverse wall 16. On each side of the body is arranged a member 29 in continuation of the box sectional member 26, 27. This member 29 is an outwardly facing channel fastened to the inner face of the side wall 12 and extending from the shroud pan to the front post. The members 29 transmit the stresses from the transverse wall 16 and from the longitudinal bracing members 26, 27 to the front post which in turn transmits the stresses to the roof and to the longitudinal headers above the door openings. The roof and the headers are not shown but they may be formed in a well known manner as load transmitting members of the combined body and chassis structure.

The inclined transverse wall structure 16 and the dashboard very efficiently strengthen the entire front wall construction in all directions. The side walls are braced against lateral bending by their connection with the lateral sections 16'. Also the longitudinal side sill members 10 are braced by the transverse wall 16 additionally to the bracing effected by the transverse beam 11. In fact, the transverse wall structure 16, 21 and the transverse beam 11 form together an annular shaped transverse bracing structure surrounding a part of the power plant. The shroud pan member 23 gives of course additional strength to the front wall construction. It will be noted that the transverse wall 16 forms in the region above its connection with the shroud pan member 24 a part of the shroud pan structure as a whole, or, looked at from another point of view, a part of the shroud pan structure forms simultaneously a part of the inclined transverse wall structure. Also the wall portion 15 may be regarded as a portion of the inclined transverse wall structure or as the upper portion of the shroud pan.

The bracing effect of the transverse wall structures depends partly on their connection with the longitudinal side sill members. Fig. 7 shows a modified form of these connections. In this figure the side sill members are designated by the numeral 30, the side walls forming parts of the front wheel housing by the numeral 31, the lower end of one section of inclined transverse wall structure by the numeral 32, the reinforcing strip surrounding the openings in the transverse wall by the numeral 33, and the transverse beam by the numeral 34. The wall section 32 and the reinforcing strip 33 are not only provided with forwardly extending tangs 35 but also with inner downwardly bent off flanges 36 overlapping and being secured to the inner wall of the side sill members 30. The ends of the cross beam 34 are widened so as to create wider and stiffer connections with the longitudinal members 30.

In the embodiment shown in Fig. 8 the combined chassis and body underframe comprises longitudinal side sills 37 and a forward transverse brace 38. The side walls 39 of the cowl structure are seated on and fastened by inwardly bent off flanges 40 to the upper wall of the sills 37. Between the forward margins of the cowl side walls 39, an inclined transverse wall 41 is inserted. The construction of this transverse wall 41 and its connection to the side sills 37 and to an upper cowl and shroud pan stamping 42, 43 as well as to its connection with lower shroud pan member 44 correspond substantially to the embodiment shown in Figs. 1 to 4 and 6. The transverse wall 41 surrounds again an opening for allowing the power plant to extend therethrough and the margins of the opening are reinforced by a channel shaped and flanged strip 45. This embodiment differs from the embodiment disclosed in Figures 1 to 6 mainly therein that the body side walls are not extended beyond the inclined transverse wall 41.

In the embodiment shown in Fig. 9 the shroud pan 47 extends upwardly to the upper horizontal wall 48 of the cowl and the inclined transverse wall 49 is fastened to the forward face of the shroud pan 47 in a region spaced from and below the flanges 50 by which the members 47 and 48 are connected. In this embodiment, the upper portion 47' of the shroud pan 47 is rearwardly inclined so as to come nearly into the same plane with the member 49 and it can be regarded as a portion of the inclined transverse wall structure. It will be noted that in the other embodiments, the upper portion of the inclined transverse wall structure is formed as a part of the dashboard.

The embodiment shown in Figs. 10 to 13 and 15 differs only slightly from the embodiment shown in Figs. 1 to 5. Here again side wall stampings 51 form skirts 52 of the front wheel housings. The side wall members 51 are connected with each other by the upper wall 53 of the cowl and by the inclined brace members 54, 55. The inclination of the brace 55 is less steep than in the instance of the formerly described embodiments. The skirts 52 and adjacent parts of the side wall members 51 form together with members 56 closed box sectional side sills in the region of the motor compartment. Those rails 56 may end at 57 shortly behind the front post 58.

The dashboard member 54 is firmly secured along its upper margin and along its vertical margins to the wall 55 and the side walls 51, 52 respectively. Along its lower margin this dashboard 54 is firmly secured by flange 59 to the forward margin of the floor panel 60. The floor plate 60 forms a load transmitting member of the body structure. The forward end of plate 60 is provided with a downwardly depending stiffening flange 61 and its side margins are provided with downwardly and outwardly extending flanges 62 and 63 respectively. These flanges 62 and 63 form with the rails 56 a closed box sectional sill as shown in Figs. 11 and 13. In the threshold region the flanges 62 and 63 of the flooring form together with a threshold member 64 of the side wall panel also box sectional side sills as shown in Fig. 15. The threshold member 64 overlaps with its upper wall 65, the side margin of the floor plate 60 and is welded thereto. In its lower part the member 64 is inwardly offset at 66 and provided with an outwardly extending flange 67 which overlaps and is secured to the flange 63 of the flooring. As clearly shown in Figs. 12 and 13 the flooring 60 and the rail members 56 overlap each other to a certain extent thereby giving strength in that section where the flooring does not form a box sectional sill with the side wall panel.

The inclined transverse stiffening wall 55 is, as in the formerly described embodiments, stiffened around its central opening by a channel shaped rail 68. The inclination of the stiffening wall 55 is, however, in this embodiment, less steep than in the formerly described embodiment, whereby it extends nearer to the forward ends of the side sills and may more effectively interbrace the forward ends of said side sills and the body superstructure.

In Fig. 14 the inclined stiffening wall 69 is provided along the margin surrounding the central opening with a beading 70 corresponding in form to the cross section of the stiffening rail 71. Hereby a substantial increase in strength around the opening of the wall 69 is attained.

So as to most effectively transmit the stresses from the ends of the entire structure toward the upper part of the body, the inclination of the transverse structure is preferably about or less than 45 degrees relative to the horizontal.

Many further modifications of the shown and described embodiments are possible. The invention is especially not restricted to vehicles having the motor arranged in front. The invention is furthermore not restricted to a motor space but may also be used for reinforcing other similar spaces, for instance a luggage space. All and every such modifications are intended to be covered by the following claims.

Another embodiment of the invention is disclosed and its specific features are claimed in the copending application Serial No. 349,704, "Vehicle structure, especially vehicle front end structure" filed August 2, 1940, in the names of Edward J. Deisley, Alexander R. Lindsay, and applicant as co-inventors.

What I claim is:

1. In a vehicle comprising a body, body side structure wall, a transverse wall structure being inserted adjacent one end of the vehicle between and fastened to said side wall structure, said side and transverse wall structures being adapted to transmit mechanical stresses, said transverse wall structures extending from about the body underside upwardly and being arranged substantially in a single plane, said plane being inclined substantially throughout the length of the transverse wall structure relative to the horizontal in the longitudinal direction and toward the far off end of the vehicle, an opening in said inclined transverse wall structure, the margins of said opening being spaced at least from the upper margin and from the side margins of said transverse wall structure.

2. In a vehicle comprising a body, body side walls and a member inserted between said side walls in a region substantially above their lower margins, a transverse wall structure adapted to withstand substantial mechanical stresses being inserted between and fastened to said side walls below said member, said transverse wall structure extending from about the body underside upwardly and being fastened along its upper margin to said member connecting the upper margins of the side walls, said transverse wall structure being furthermore inclined substantially throughout its length relative to the horizontal in the longitudinal direction of the vehicle and arranged substantially in a single plane, an opening in said inclined transverse wall structure, the margins of said opening being spaced at least from the upper margin and from the side margin of the transverse wall structure, said transverse wall structure strongly reinforcing and interbracing the side walls and the body as a whole in longtudinal, vertical and transverse direction.

3. In a vehicle comprising a body and a power plant, body side walls enclosing a power plant compartment, a transverse wall structure inserted between and fastened to said side walls within the region of said power plant compartment, said transverse wall structure extending from about the underside of said power plant compartment and being arranged substantially in a single plane, said plane being considerably inclined substantially throughout the length of the offset transverse wall structure in the longitudinal direction and toward the transverse middle plane of the vehicle, said transverse wall structure being provided with an opening permitting a part of the power plant to extend therethrough and being adapted to transmit mechanical stresses.

4. In a vehicle comprising a body and a power plant, said body forming a compartment for passengers or freight, body side walls being provided with extensions at least at one end beyond the said first compartment so as to form a compartment for the power plant, a transverse wall structure being inserted between and fastened to said side walls and their extensions at the end of the body, said transverse wall structure extending from about the body underside upwardly and being arranged substantially in a single plane, said plane being inclined substantially throughout the length of the transverse wall structure toward the transverse vertical middle plane of the body, an opening in said inclined transverse wall structure adapted to have a part of the power plant to extend therethrough, said transverse wall structure forming a transverse and diagonal brace between said side walls and a compression chord member in the longitudinal direction of the body.

5. In a vehicle comprising a dashboard and cowl structure, the side walls of said cowl being extended forwardly beyond the plane of the dashboard and forming at least partly side walls of a motor compartment, a transverse wall structure inserted between and fastened to said forward extensions of the cowl side walls and to the upper part of the dashboard and cowl structure, said transverse wall structure comprising two sections which extend from said cowl wall extensions with their inner margins unsupported into the motor compartment and are inclined rearwardly and upwardly, said transverse wall structure being provided with an opening allowing a part of the motor unit to extend therethrough, sill structures being arranged along and being connected with the lower margins of said cowl wall extensions, the lower ends of said sections being connected to said sill structures.

6. In a vehicle body according to claim 5, a dashboard arranged at least partly behind said transverse wall structure and being also fastened to the side walls of the cowl.

7. In a vehicle body according to claim 5, said inclined transverse wall structure extending up to the upper wall of the cowl and being fastened thereto, and a dashboard being fastened to the underside of said transverse wall structure below the upper wall of the cowl but above the upper margin of said opening.

8. In a combined vehicle body and chassis structure, longitudinal frame members extending along the sides of a motor compartment, body side walls enclosing at least partly the motor compartment, a transverse wall structure adapted to withstand mechanical stresses being, inserted between and fastened to said side walls, said transverse wall structure being also fastened near its lower margins to said longitudinal frame members at points between the forward and rearward end of the motor compartment, said transverse will structure being arranged substantially in a single plane, said plane being inclined substantially throughout the length of said transverse wall structure relative to the horizontal and the longitudinal direction and toward the far off end of the vehicle, said transverse wall structure being provided with an opening allowing a part of a motor unit to extend therethrough.

9. In a vehicle according to claim 20, the transverse width of said opening increasing from its highest point downwardly.

10. In a vehicle according to claim 20, a separately manufactured reinforcement connected with said transverse wall structure along the side margins and the upper margin of said opening.

11. In a vehicle according to claim 20, a channel shaped member provided with marginal flanges being fastened to said transverse wall structure along the side margins and the upper margin of said opening so that the mouth of the channel is closed by said transverse wall structure.

12. In a combined vehicle body and chassis structure according to claim 8, a reinforcement fastened to said transverse wall structure along the side margins and the upper margin of said opening, said reinforcement extending downwardly to the longitudinal frame members and being connected therewith.

13. In a combined vehicle body and chassis structure according to claim 8, bracing members being inserted between a point of said frame members situated beyond said transverse wall structure in the direction toward the adjacent end of the body and chassis structure and a point of said transverse wall structure situated between its upper and lower margins.

14. In a combined vehicle body and chassis structure according to claim 8, bracing members being inserted between a point of said sill members situated beyond said transverse wall structure in the direction toward the adjacent end of the body and chassis structure and a point of said transverse wall structure situated between its upper and lower margins, the areas defined by said longitudinal sill member extensions, by the side margins of said transverse wall structure and by said bracing members being closed on each side of the body by forward extensions of the body side walls, said extensions forming the inner walls of the wheel housings.

15. In a combined vehicle body and chassis structure according to claim 8, bracing members being inserted between a point of said sill members situated beyond said transverse wall structure in the direction toward the adjacent end of the body and chassis structure and a point of said transverse wall structure situated between its upper and lower margins, and further bracing means arranged on the other side of said transverse wall structure within the body proper, said additional bracing means being adapted to transmit the stresses from the ends of the first named brace members which are adjacent said transverse wall structure and from said transverse wall structure itself to the adjacent body posts.

16. In a vehicle according to claim 4, a transverse brace inserted between the lower margins of the body side walls near the lower margin of said transverse wall structure.

17. In a combined vehicle body and chassis construction according to claim 8, a transverse brace inserted between said longitudinal sill members near the points of attachment of said transverse wall structure.

18. In a vehicle according to claim 20, said transverse wall structure being provided along the margins of said opening with a beading and being connected with a strip closing the mouth of said beading thereby forming a closed box sectional reinforcing member.

19. In a vehicle according to claim 20, the inclination of said transverse structure being about or less than 45° relative to the horizontal.

20. In a vehicle, upstanding wall structures having portions spaced from each other and defining two sides of a compartment adapted to receive other parts; a further wall structure extending transversely between and being fastened to said spaced portions of said upstanding wall structures, said upstanding and said transverse wall structures being of a nature adapted to transmit mechanical stresses each in the direction of their respective plane, said transverse structure being arranged substantially in a single plane and being inclined substantially throughout its length relative to the horizontal and in the direction of the longitudinal extent of said upstanding wall structures and being provided with an opening the area of which covers a substantial part of the area defined by the outer margins of said transverse wall structure, said inclined transverse wall structure strongly reinforcing and interbracing the walls of the compartment in longitudinal, vertical and transverse direction, the opening in said transverse wall structure allowing the extension of parts housed in the compartment to extend therethrough and the inclination of said transverse structure facilitating the access through said opening to that part of the compartment which is partly covered by said transverse structure.

21. In a vehicle, a body comprising side walls and an end wall portion, the latter mainly above the belt line, said end wall portion being inclined longitudinally toward the transverse middle plane of the body, the side walls being extended below the belt line beyond said end wall portion toward the adjacent end of the vehicle, said extended wall portions forming at least partly side walls of a compartment at the end of the vehicle such as for a motor, a transverse wall structure inserted between and fastened to said extended side wall portions and to the lower transverse margin of said end wall portion, said transverse wall structure being likewise inclined toward the transverse middle plane of the vehicle and being provided with an opening allowing a part, such as a motor unit, which is to be housed in said compartment to extend therethrough, the margins of said transverse wall structure at the sides of said opening extending unsupportedly into said compartment leaving open compartment space on both sides, said end wall portion and said transverse wall structure transmitting stresses from the one end of the lower part of the vehicle upwardly and longitudinally to the direction toward the transverse middle plane of the body into the upper part of the body, and said transverse wall structure forming besides a transverse and diagonal brace between the side walls and their extended portions.

22. In a vehicle, a body comprising side walls and an end wall portion between said side walls below the belt line, said side walls being extended beyond said end wall toward the adjacent end of the vehicle, said extended wall portions forming at least partly side walls of a compartment at the end of the vehicle such as for a motor unit, said end wall portion forming simultaneously an end wall for said compartment, side sill structures along the lower margins of said extended wall portions, a transverse wall structure inserted between and fastened to said extended side wall portions within said compartment, said transverse wall structure being inclined toward the transverse middle plane of the vehicle, being fastened near its upper margin to said end wall portion, and being provided with an opening allowing a part, such as a motor unit, which is to be housed in said compartment to extend therethrough, the lateral portions of said transverse wall structure extending from said extended side wall portions with their inner margins unsupportedly into said compartment, said transverse wall structure transmitting stresses from the one end of the lower part of the vehicle upwardly and longitudinally in the direction toward the transverse middle plane into the upper part of the body, and said transverse wall structure and said end wall portion including together in side view an angle and forming a transverse and diagonal brace between said side walls and their extended portions.

23. In a vehicle, a body comprising side walls and an end wall portion between said side walls below the belt line, said side walls being extended beyond said end wall portion toward the adjacent end of the vehicle, said extended wall portions forming at least partly side walls of a compartment at the end of the vehicle such as for a motor unit, a transverse wall structure being inserted between and fastened to said extended side wall portions within said compartment, said transverse wall structure being inclined toward the transverse middle plane of the vehicle, being fastened near its upper margin to said end wall portion, and being provided with an opening allowing a part, such as a motor unit, which is to be housed in said compartment to extend therethrough, said transverse wall structure being substantially in the form of a web which extends from said extended side wall portions substantially unsupportedly, into said compartment, said transverse wall structure transmitting stresses from the one end of the lower part of the vehicle upwardly and longitudinally in the direction toward the transverse middle plane into the upper part of the body, said end wall portion being at least partly inclined oppositely to said transverse wall structure, said transverse wall structure and said end wall portion forming besides a transverse, longitudinal and diagonal brace between said side walls and their extended portions.

24. In a vehicle comprising a body and a power plant, body side walls enclosing a power plant compartment, a transverse wall structure inserted between and fastened to said side walls in the region of said power plant compartment, said transverse wall structure extending from about the underside of said power plant compartment and being arranged substantially in a single plane, said plane being considerably inclined substantially throughout the length of the transverse wall structure in the longitudinal direction and toward the transverse middle plane of the vehicle, said transverse wall structure being furthermore provided with an opening permitting a part of the power plant to extend therethrough, an upper portion of said transverse wall structure extending above said opening uninterruptedly from one side wall to the opposite one, the lower portion of said wall structure on each side of said opening increasing in width from its lower end to its merger into said upper portion, said transverse wall structure forming a main load transmitting and reinforcing member of the body.

25. In a motor vehicle, in combination, a main body assembly which terminates forwardly at a point adjacent the cowling structure thereof, said cowling structure including a front sheet, a forwardly disposed stub frame secured to the lower part of the forward end of said body assembly, a brace having one end connected to the upper portions of each side of the forward end of the body assembly and extending forwardly to points on each side of said stub frame which are spaced forwardly from said body assembly and to which the forward end of the brace is connected, and an intermedoate portion of said brace extending along said front sheet in contact therewith and connected thereto and serving to reinforce and brace said front sheet.

26. In a motor vehicle, a main body assembly which terminates forwardly adjacent the cowling thereof, said assembly comprising a front panel construction including a cowl of a generally inverted U-shaped configuration having side and top sheet portions and a front sheet sloping downwardly and forwardly from said top sheet portion and connecting the upper parts of said side sheet portions, a forward motor supporting stub frame, means for securing said stub frame to the forward end of said main body assembly, and a unitary bracing member extending from a point on said stub frame upwardly and rearwardly therefrom and underlying said front sheet and said side sheet portions of said cowl so as to reinforce and interbrace the same.

27. In a motor vehicle, a body assembly including cowling having a transverse disposed front sheet, a pair of forwardly projecting side frame members, a brace member disposed along the rear side of said front sheet and extending transversely from end to end thereof, a portion of said brace member also extending forwardly from a central point on said sheet to said projecting side frame members.

28. In a motor vehicle, a body assembly including a cowl of the conventional inverted U-shaped contour and provided with a forwardly and downwardly inclined front sheet, a pair of forwardly projecting side frame members, a brace member disposed along the inner sides of both the front sheet and the side portions of said cowl to reinforce the same, a portion of said brace member also extending forwardly from said front sheet to said projecting side frame members.

29. In a vehicle, a body comprising side walls and an end wall portion extending between and having its lateral margins fastened to said side walls below the belt line, said side walls having portions extending beyond said end wall toward the adjacent end of the vehicle, a bottom structure having sill portions extending along and connected with the lower margins of said extended side wall portions, said extended wall portions forming at least partly side walls of a compartment at the end of the vehicle such as for a motor unit, a brace having one substantially planar section on either side of the longitudinal centre line of the body, said sections being generally in the form of a web or sheet and arranged substantially in a plane which extends transversely to the body and from points near the lower margins of said side wall extensions and spaced from said end wall to the upper portion of said end wall, said brace sections extending unsupportedly into the compartment so as to leave the space in their front and rear in free communication with the remainder of the compartment, said brace sections having narrow lower ends and being gradually widened toward the end wall; said sections having their lateral margins conforming and fastened substantially throughout to said side wall extensions, having their lower ends fastened to said sill portions of said bottom structure and having the widened upper ends substantially throughout connected with said end wall portion; said sections leaving a free space between them allowing a part, such as a motor unit, which is to be housed in said compartment to extend therethrough, said brace sections transmitting stresses from the one end of the lower part of the vehicle upwardly and longitudinally in the direction toward the transverse middle plane into the upper part of the body.

30. In a vehicle, a body comprising body side walls and a body end wall portion between said side walls below the belt line, said side walls being extended beyond said end wall portion toward the adjacent end of the vehicle, said extended wall portions forming at least partly side walls of a compartment at the end of the vehicle such as for a motor unit, a transverse wall of sheet material being inserted between and fastened substantially throughout the length of its correspondingly shaped side margins to said extended side wall portions within said compartment, said transverse wall being inclined toward the transverse middle plane of the vehicle, being fastened near its upper margin to said end wall portion, and defining at least the lateral sides of an open space allowing a part, such as a motor unit, which is to be housed in said compartment to extend therethrough, an upper marginal portion of said inclined transverse wall constituting a part of said end wall portion, said transverse wall extending with its inner lateral margins unsupportedly into the space of the compartment and transmitting stresses from the one end of the lower part of the vehicle upwardly and longitudinally in the direction toward the transverse middle plane into the upper part of the body, said end wall portion being at least partly inclined with respect to a transverse vertical plane in a direction opposite to the inclination of said transverse wall, the space between the end wall portion and said inclined transverse wall being freely accessible from the interior of the motor compartment and forming a part thereof.

THEO. ULRICH.

CERTIFICATE OF CORRECTION.

Patent No. 2,289,395. July 14, 1942.

THEODORE ULRICH.

It is hereby certified that error appears in the printed specification of the above numbered patent requiring correction as follows: Page 2, second column, line 70, after the word "dashboard" insert --structure--; page 3, first column, line 14-15, after "dashboard" insert --member--; and second column, line 5, claim 1, for "structure wall" read --wall structures--; line 7, same claim, for "structure" read --structures--; line 64, claim 4, strike out "the" before "said"; page 4, first column, line 47, claim 8, for "will" read --wall--; page 5, first column, line 38, claim 21, for "to the" read --in the--; and second column, line 70, for "intermedoate" read --intermediate--; and that the said Letters Patent should be read with this correction therein that the same may conform to the record of the case in the Patent Office.

Signed and sealed this 26th day of September, A. D. 1944.

Leslie Frazer (Seal)

Acting Commissioner of Patents.